United States Patent Office 2,802,809
Patented Aug. 13, 1957

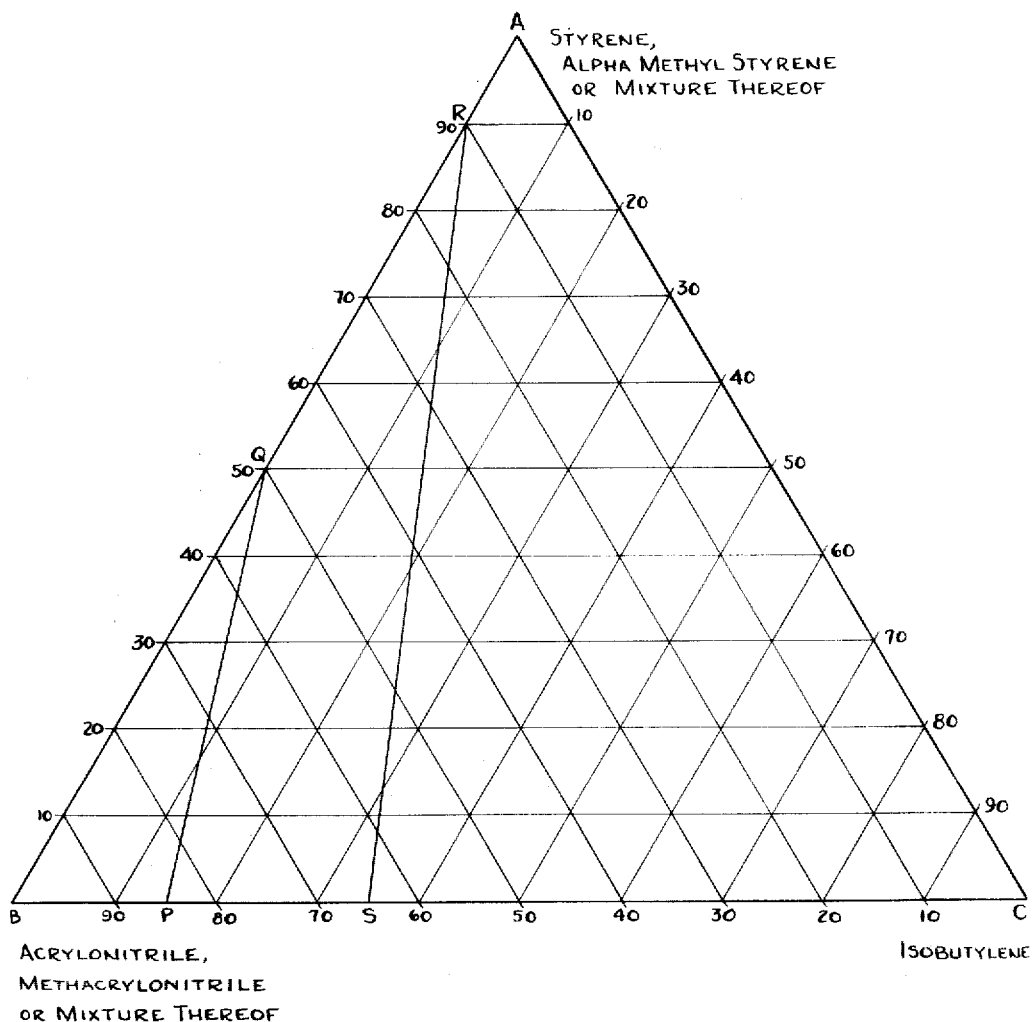

2,802,809

COMPOSITIONS OF VINYL CHLORIDE RESINS AND GRAFT COPOLYMERS OF ACRYLONITRILE-TYPE MONOMER COMPOSITIONS UPON DIENE POLYMERS AND ARTICLES FORMED THEREFROM

Robert A. Hayes, Akron, Ohio, assignor to The Firestone Tire & Rubber Company, Akron, Ohio, a corporation of Ohio Application November 30, 1953, Serial No. 394,958

21 Claims. (Cl. 260—45.5)

This invention relates to polyvinyl chloride compositions having greatly improved impact strengths. In general, the compositions of this invention comprise (A) vinyl chloride resins blended with (B) graft copolymers of mixtures of styrene and acrylonitrile or their equivalents upon diene rubber substrates. As used in the present specification, and as defined in the Report on Nomenclature of the International Union of Pure and Applied Chemistry, Journal of High Polymer Science, vol. VIII, p. 260, the term "graft copolymer of a mixture of styrene and acrylonitrile upon a diene rubber" signifies a polymeric product produced by subjecting a mixture of styrene and acrylonitrile or their equivalents to polymerizing conditions in the presence of a previously polymerized diene rubber, as more fully described hereinafter.

A highly successful development in the vinyl chloride resin field has been the use of these resins in unplasticized or only slightly plasticized form as moldings, piping, sheets and the like. These materials are easily fabricated and have outstanding resistance to chemical attack, as a consequence of which they have come into extensive use in the chemical and process industries. Unplasticized vinyl chloride resins are rather brittle, however, and this deficiency has limited their use to situations where shock and impact loads are not encountered. Attempts to improve the impact strength of polyvinyl chloride by incorporation of plasticizers, butadiene-acrylonitrile rubbers, and like compounding ingredients have been unsuccessful, because the improvement in impact strength obtained in this way has entailed an undue sacrifice of other properties, particularly heat distortion temperature.

Accordingly, it is an object of this invention to provide novel vinyl chloride resin compositions having improved properties.

Another object is to provide rigid vinyl chloride resin compositions having greatly improved impact strength.

A further object is to provide such compositions which will have improved impact strength without sacrificing the other desirable properties thereof.

Still another object is to provide rigid vinyl chloride resin compositions having both high heat distortion temperature and high impact strengths.

The invention will be described in connection with the accompanying drawing; which is a trilinear composition diagram showing the proportions of monomers to be included in a graft copolymer to be used in practicing the invention.

SYNOPSIS OF THE INVENTION

The above and other objects are secured, in accordance with this invention in compositions comprising

|  | Percent |
|---|---|
| (A) A vinyl chloride resin | 50–95 |
| (B) A graft copolymer, upon a rubbery diene polymer or copolymer, of a styrene-acrylonitrile or styrene-isobutylene-acrylonitrile type mixture [1] | 5–50 |

[1] Based on the total weight of the constituents (A) and (B).

Hereinafter, for brevity, the mixture (B) will be designated a "styrene-acrylonitrile-type mixture." The ingredients (A) and (B) should in turn constitute at least 50% of the entire composition, the balance being made up of conventional fillers, pigments, reinforcing agents, plasticizers and the like. In a preferred embodiment of the invention, in which the compositions are in rigid, unplasticized form, any plasticizers or other resin-soluble ingredients should constitute not more than 10% by weight of the resin plus such resin-soluble ingredients. The compositions have impact strengths, both at high and low temperatures, far superior to comparable vinyl chloride resins heretofore prepared; and in all other relevant properties, notably modulus of elasticity, hardness and heat distortion temperatures, the compositions are fully equal to conventional polyvinyl chloride compositions.

*The graft copolymers of styrene-acrylonitrile-type or styrene - isobutylene - acrylonitrile - type mixtures upon rubbery diene polymers and copolymers*

These are materials produced by adding monomeric styrene-acrylonitrile-type mixtures to an already completely or nearly completely free-radical-polymerized latex of a diene rubber, which latter material will be more fully discussed hereinbelow. Polymerization by free-radical mechanisms is then continued. In the resultant product, the monomers in the styrene-acrylonitrile mixture appear to have combined with the already polymerized diene rubber; at any rate, only small amounts of the polymers or copolymers which would result from the styrene-acrylonitrile mixture can be separated therefrom by physical methods. Such products are referred to in this specification as "graft copolymers" of styrene-acrylonitrile-type mixtures upon the diene rubbers. Without absolute commitment to this theory, it is believed that centers along the chains of already polymerized diene rubber in the original latex are reactivated and serve to start new branching side-chains of polymerized monomers from the styrene-acrylonitrile mixture attached to the old diene rubber polymer chains.

With reference to the styrene-acrylonitrile-type mixture of monomers to be graft copolymerized upon the diene rubber, these are mixtures of (I) Styrene, alpha-methyl styrene, isobutylene, or a mixture of any of these within the range of proportions set forth below _____ plus
(II) Acrylonitrile or methacrylonitrile or a mixture of these in any proportion _____

} Within the limits of compositions bounded by the q u a d rilateral PQRS on the drawing.

The styrene and alphamethyl styrene of the ingredients (I) are fully interchangeable with each other, and the acrylonitrile and methacrylonitrile of ingredients (II) are fully interchangeable with each other, in the practice of this invention. However, the incorporation of isobutylene necessitates an adjustment of the limits within which the ingredients (I) on the one hand, and the ingredients (II) on the other hand, may be mixed. These relationships are shown in the trilinear chart of the drawing, wherein the quadrilateral PQRS encloses the area representing compositions operative in this invention. The coordinates of the vertices of the quadrilateral PQRS are as follows.

TABLE I

| Vertex | A<br>Styrene, alphamethyl styrene, or mixtures of these two in any proportions | B<br>Acrylonitrile, methacrylonitrile or mixtures of these two in any proportions | C<br>Isobutylene |
|---|---|---|---|
| P | 0 | 85 | 15 |
| Q | 50 | 50 | 0 |
| R | 90 | 10 | 0 |
| S | 0 | 65 | 35 |

With reference to the diene rubber latex upon which the styrene-acrylonitrile-type mixture or their homologs is to be graft copolymerized, this may be a latex of a synthetic rubber having polymerized therein the following monomers in the following proportions.

|  | Percent |
|---|---|
| Butadiene, isoprene, or a mixture thereof in any proportion | 60–100 |
| Acrylonitrile, alpha-methyl acrylonitrile, styrene, alpha-methyl styrene or a mixture of any of these in any proportion | 0–40 |
| Other non-cross-linking monomers copolymerizable with butadiene and isoprene | 0–10 |
| Other cross-linking monomers copolymerizable with butadiene and isoprene | 0–30 |

The percentages are based on the weight of the rubber contained in the latex and are chosen so as to add up to 100%. The rubbers are essentially the synthetic diene rubbers of commerce, i. e., butadiene or isoprene rubbers, with or without the addition of substantial but minor proportions of acrylonitrile, methacrylonitrile, styrene or methyl styrene. The other non-cross-linking monomers and cross-linking monomers do not alter the essential natures of these rubbers. Suitable cross-linking monomers include for instance non-conjugated ethylenically doubly-unsaturated compounds such as divinyl benzene. Suitable non-cross-linking comonomers include monoethylenic and conjugated diethylenic unsaturated compounds such as, for instance, vinyl compounds on the order of vinyl acetate, vinyl formate, vinyl propionate, higher fatty vinyl esters such as vinyl stearate, vinyl chloride, vinyl fluoride and the like; vinyl aromatics such as the various mono- and poly-nuclearly-chlorinated styrenes, vinyl naphthalene, vinyl carbazole and the like; vinyl ethers and ketones such as methyl vinyl ether, isopropyl vinyl ether and the like; vinylidene compounds such as vinylidene chloride, vinylidene chlorobromide, methyl isopropenyl ketone, isopropenyl acetate and the like; acrylic compounds such as acrylic acid, methacrylic acid, methyl acrylate, methyl methacrylate, ethyl acrylate, diethyl maleate, maleic anhydride, and the like; and conjugated unsaturated compounds such as isoprene, 2,3-dimethyl-1,3-butadiene, chloroprene, piperylene, 2,3-dichloro-1,3-butadiene and the like. For a more complete list of compounds known to copolymerize with butadiene and isoprene, reference is made to Krczil "Kurzes Handbuch Der Polymerisations—Technik," Edwards Brothers, Inc., vol. 2, p. 655, 656, the items indented under "Butadien."

The original polymerization of the latex upon which the styrene-acrylonitrile-type mixture is to be graft copolymerized is carried out in accordance with any usual or suitable procedure in this art. In general, the butadiene and/or isoprene, together with any comonomers to be used, is emulsified in water with the aid of micelle-forming emulsifying agents which are usually compounds containing hydrocarbon groups of from 8 to 22 carbon atoms coupled to highly polar solubilizing groups such as alkali metal and ammonium carboxylate groups, sulfate half-ester groups, sulfonate groups, phosphate partial ester groups and the like. Exemplary emulsifying agents include sodium oleate, sodium stearate, the sodium salts of the sulfate half esters of fatty alcohols produced by reduction of the fatty acids of natural oils such as cocoanut oil, sodium abietate, sodium salts of sulfosuccinic esters such as sodium dioctyl sulfosuccinate, sodium salts of alkylated benzene and naphthalene sulfonic acids such as sodium didodecyl naphthalene sulfonate, sodium salts of monosulfated fatty monoglycerides and the like. The polymerization medium will contain a suitable water-soluble free-radical-generating catalyst such as hydrogen peroxide, potassium or sodium persulfates, perborates, peracetates, percarbonates and the like, which catalysts may be associated with activating systems such as redox systems involving versivalent metals and mild reducing agents. Generally also the polymerization medium contains a chain-transfer agent such as a higher alkyl mercaptan on the order of dodecyl mercaptan, which both moderates the molecular weights of the products and also assists in initiating the action of the catalysts in the polymerization. However, these are preferably used in somewhat smaller quantities than is ordinarily the case when butadiene is being polymerized to produce a general purpose elastomer, as any residual chain transfer agent may unduly retard the reaction of the styrene or alphamethyl styrene added for graft copolymerization. Polymerization is carried out at temperatures from about 40° C. to 80° C. or, in the case of the activated systems, is carried out over a range including lower temperatures such as 0° C. to 80° C. The polymerization will usually be carried to a conversion of at least about 75% before the monomers are added for graft copolymerization thereon. Any unreacted butadiene and/or isoprene and/or associated comonomer is optionally, and preferably, stripped off from the latex before the monomers are added for graft copolymerization.

To the latex prepared as just described, there is added a styrene-acrylonitrile-type mixture or styrene-acrylonitrile-isobutylene-type mixture in amounts such that the total added monomers constitute at least 10% of the combined weight of this newly added monomeric mixture and the polymer or copolymer of butadiene and/or isoprene already in the latex. Polymerization is continued, either under the action of the catalyst originally supplied in the preparation of the latex, or by the action of supplemental catalysts of the same type. Polymerization conditions are continued until the amount of the added monomeric mixture which has graft copolymerized upon the latex amounts to from 10% to 80% of the entire resultant graft copolymer. The resultant latex is either coagulated at once to recover the graft copolymer for mill-mixing with the other constituents, or the latex is used for blending with the other ingredients in latex form.

The vinyl chloride resin

This may be a homopolymer of vinyl chloride, or a copolymer thereof with minor proportions of other ethylenically unsaturated compounds copolymerized therewith. In a preferred form of the invention, the vinyl chloride resin is a simple homopolymer of vinyl chloride, since the hardest and most rigid compositions are obtainable with the homopolymers of vinyl chloride; however, the resin may contain up to 20% of other unsaturated compounds copolymerizable with vinyl chloride without detracting from the essential nature of the vinyl chloride resin. Conversely stated, the resins should have at least 80% of vinyl chloride copolymerized therein. Suitable unsaturated compounds include, for instance, vinylidene chloride, vinylidene bromide, vinylidene fluorochloride, and the like; unsaturated hydrocarbons such as ethylene, propylene, isobutene and the like; allyl compounds such as allyl acetate, allyl chloride, allyl ethyl ether and the like; and conjugated and cross-conjugated ethylenically unsaturated compounds such as butadiene, isoprene, chloroprene, 2,3-dimethylbutadiene - 1,3, - piperylene, divinyl ketone and the like. For a fairly complete list of materials known to polymerize with vinyl chloride, reference may be had to Krczil: "Kurzes Handbuch Der Polymerisations—Technik—11 Mehrstoff Polymerization" Edward Bros. Inc., 1945, pp. 735–747, the items under "Vinyl chlorid." As a rough rule, the criterion of a practical comonomer for use with vinyl chloride, to produce copolymers containing 80% or more of vinyl chloride is that, on a mole percentage basis, an initial charge of 96% vinyl chloride, balance comonomer, shall yield an initial copolymer containing (a) at least 90% vinyl chloride, and (b) not more than 99% vinyl chloride. On this basis, satisfactory comonomers for use with vinyl chloride will be those having "$Q_2$" and "$e_2$" values, as described in J. Polymer Science 2:101, correlated as follows, assuming for vinyl chloride $$Q_{\text{vinyl chloride}} = .03, \text{ and } e_{\text{vinyl chloride}} = .3$$

$$4.1 > \frac{.029e^{-.3(.3-e_2)} }{Q_2} + .04 > .37$$
$$\frac{}{1.33 Q_2 e^{e_2(.3-e_2)} + .96}$$

Instead of the single unsaturated comonomers of the types above indicated, mixtures of such comonomers may enter into the copolymers, it being understood that the total quantity thereof shall be small enough (i. e., not over 20% based on the weight of the copolymer) that the essential character of the polyvinyl chloride chain is retained.

Compounding the compositions of this invention

The proportions of the essential vinyl chloride resin and graft copolymer, and the optional proportions of pigments and compounding ingredients have been set out hereinabove. The greatest advantage of this invention is obtained in the case of rigid, substantially unplasticized vinyl resin compositions, and for this purpose any compounding materials capable of dissolving in the vinyl chloride resin and of plasticizing it should be kept at relatively low levels, say 10% or less, based on the weight of vinyl chloride resin in the compositions.

Referring to the mode of compounding the materials of this invention, one convenient method is to thoroughly mix together latices containing the vinyl chloride resin and graft copolymer, and thereafter to add a coagulating agent to cause all the materials to be simultaneously coprecipitated from the mixed latex. This method has the advantage of ready and accurate measurement, a somewhat more thorough and reliable blending, and a saving in power expenditure over mill mixing. The alternative is, of course, to blend solid components by means of a roll mill, banbury mill or the like. No great difference in properties between compositions prepared by the two methods has been noted.

Compositions according to this invention are used in any of the applications where vinyl chloride resins have heretofore been employed, and in any given formulation will exhibit properties equal or superior to vinyl chloride resins in all respects. A preferred aspect of the invention is concerned with unplasticized rigid vinyl chloride resin formulations in which the vinyl chloride resin is essentially a simple polyvinyl chloride containing little or no comonomers copolymerized therein, and which contain little or no (say less than 10%) of materials which are soluble in the polyvinyl chloride and which would plasticize the same. Such compositions have properties substantially identical in modulus, hardness and heat-distortion temperatures with conventional rigid polyvinyl chloride formulations; in addition to this, the compositions of this invention have sharply superior impact strengths as compared with corresponding conventional rigid vinyl chloride formulations. The compositions of this invention are therefore vastly superior replacements for rigid vinyl resin in the applications in which the latter have had such remarkable success, viz., in piping, fittings, fume ductwork, vessels and vessel linings, pump and fan vanes and impellers, treatment racks and the like in chemical and process industries.

With the foregoing general discussion in mind, there are given herewith detailed examples of the practice of this invention. All parts given are by weight.

EXAMPLE I

A. Preparation of graft copolymer substrates

TABLE II

| | Parts | | | |
|---|---|---|---|---|
| | L | M | N | O |
| Butadiene | 100 | 90 | 80 | 75 |
| Acrylonitrile | 0 | 10 | 20 | 25 |
| Potassium persulfate | 0.4 | 0.4 | 0.4 | 0.4 |
| Dodecyl mercaptan | 0.05 | 0.05 | 0.05 | 0.05 |
| Sodium oleate | 5.0 | 5.0 | 5.0 | 5.0 |
| Water | 200 | 200 | 200 | 200 |

A series of substrates was prepared for graft copolymerization in accordance with Table III, using the ingredients set forth in Table II in the proportions indicated in columns L, M, N and O in the respective preparations. In each case the selected ingredients were charged into a polymerization vessel, the free space of which was then purged with butadiene vapor. The charge was polymerized at 50° C. for 16 hours under autogenous pressure, resulting in conversion of approximately 98% of the monomeric material to polymeric form. At the end of the polymerization period the as-yet-unpolymerized monomers were vented, and the resultant latex, containing approximately 33% of polymeric material, cooled to 25° C. The latices derived from the charges containing 100, 90, 80 and 75 parts of butadiene are hereinafter designated respectively as latices L, M, N and O.

B. Preparation of graft copolymer

| | Parts |
|---|---|
| Latex (Latex L, M or O, prepared as above described) | [1] 300 |
| Styrene | [2] 78 or 68 |
| Acrylonitrile | [2] 22 or 32 |
| Potassium persulfate | 0.4 |
| Dodecyl mercaptan | 0.4 |
| Water | 200 |

[1] Provides 100 parts of rubber.
[2] Per Table III.

A series of graft copolymers was prepared in accordance with the foregoing recipe, using as the latex in each case on of the latices —L, M or O— prepared as described above under "A. Preparation of Substrates." Likewise, the styrene/acrylonitrile ratio was varied in certain of the graft copolymers. In each case the selected ingredients were charged into a polymerization vessel, the free space of which was then purged with nitrogen. The vessel was then sealed, and polymerization carried out with agitation at 50° C. for 4 hours, at the end of which time all of the styrene and acrylonitrile had become polymerized by graft copolymerization upon the butadiene polymer (or copolymer) in the latex. The charge was then cooled to 25° C. and stabilized by the addition of 4 parts of a heptylated diphenyl amine ("Agerite Stalite," a product of the R. T. Vanderbilt Co.) and 4 parts of dimethyl ammonium dimethyl dithiocarbamate.

The resultant latex was coagulated by slowly pouring 3 volumes of the latex into 5 volumes of a 1% aqueous calcium chloride solution, with vigorous stirring. The coagulated graft copolymer was dewatered by filtration, washed on the filter with water and dried in an oven at 60° C.

C. Compounding with vinyl chloride resin

| | Parts |
|---|---|
| Vinyl chloride resin ("Exon 402–A," a polyvinyl chloride manufactured by The Firestone Tire & Rubber Co.) | 90, 85, 80, 75, 65 or 50 (per Table III) |
| Graft copolymer (prepared as above described; containing a substrate of pure polybutadiene; 90% butadiene/10% acrylonitrile; or 75% butadiene/25% acrylonitrile as indicated in Table III) | 10, 15, 20, 25, 35 or 50 (per Table III) |
| Cadmium lauryl mercaptide | 2 |

A series of compositions was made up in accordance with the foregoing schedule, using various of the graft copolymers prepared as described hereinabove with various proportions of the vinyl chloride resin. In each case the selected graft copolymer together with the selected amount of the vinyl chloride resin were blended together on a roll mill heated to 320° F. The resin was banded first on the mill and thereafter the graft copolymer and cadmium mercaptide were added and milling continued with frequent cutting. At the end of 3 minutes the stock was sheeted off the mill at a thickness of approximately 0.02 inch.

Six-ply laminates were prepared from the sheets removed from the mill as above described. In each case the sheets, cut into squares six inches on a side, were stacked in a flat platen press and laminated in a cycle consisting of (A) a three-minute preheat with press-platens at 180° C., (B) a three-minute application of a total load of 8–10 tons with press-platens still at 180° C., (C) a three-minute cooling cycle under pressure with cold water circulation in the platens, and (D) removal from the press. Set forth herewith in Table III are the compositions prepared and the physical properties of the laminates. It will be seen that all of the products of this invention (items 1–22) are characterized by high values of hardness, modulus and heat distortion temperatures, coupled with high impact strength both at room temperature and at subnormal temperatures. For purposes of comparison, there was also prepared a composition comprising the vinyl chloride resin without any graft copolymer. Laminates were prepared from this composition by a procedure identical with the preparation of the other laminates, and the properties are set forth in Table III, item No. 23. It will be seen that the compositions of the present invention (items Nos. 1–22) have properties of hardness, modulus and heat distortion substantially equivalent to those of the unmixed polyvinyl chloride (item No. 23), but coupled with these excellent properties they have impact strengths far exceeding that of the unmixed polyvinyl chloride. It will be noted that these excellent impact properties persist even at very low temperatures, note the values given under "−20° C." in the table.

TABLE III

| Graft Coplymer Used | | Weight Ratio Vinyl Chloride Resin/Graft Copolymer | Hardness (Rockwell, R-Scale) | Modulus (Pounds per square inch) | Heat Distortion Temperature (° C.) | Notched Izod Impact Strength (ft.lbs./in. notch) | | | Item No. |
|---|---|---|---|---|---|---|---|---|---|
| Substrate | Weight of Styrene in Grafted Monomers, Percent | | | | | At 25° C. | At 0° C. | at −20° C. | |
| "O" (75% Butadiene) | 78 | 90/10 | 107 | 300,000 | 71 | 24.4 | 0.8 | | 1 |
| | | 85/15 | 105 | 340,000 | 71 | 21.0 | 0.6 | | 2 |
| | | 80/20 | 102 | 250,000 | 71 | 25.6 | 1.7 | 0.5 | 3 |
| | | 75/25 | 94 | 250,000 | 68 | 23.6 | 14.4 | 0.6 | 4 |
| | | 65/35 | 89 | 267,000 | 65.5 | 26.2 | 15.2 | 0.8 | 5 |
| "M" (90% Butadiene) | 78 | 90/10 | 103 | 340,000 | 70 | 18.5 | 1.0 | | 6 |
| | | 85/15 | 102 | 332,000 | 70 | 14.1 | 1.4 | | 7 |
| | | 80/20 | 102 | 282,000 | 71 | 11.4 | 8.4 | 1.0 | 8 |
| | | 75/25 | 97 | 269,000 | 71 | 9.5 | 11.7 | 1.6 | 9 |
| | | 65/35 | 88 | 216,000 | 71 | 10.1 | 12.5 | 9.3 | 10 |
| | | 50/50 | 70 | 188,000 | 70 | 10.8 | 9.6 | 8.8 | 11 |
| "L" (100% Butadiene) | 78 | 90/10 | 105 | 376,000 | 72 | 17.6 | 1.2 | 0.8 | 12 |
| | | 85/15 | 98 | 307,000 | 72 | 16.7 | 16.7 | 4.6 | 13 |
| | | 80/20 | 93 | 290,000 | 71 | 16.5 | 16.7 | 14.3 | 14 |
| | | 75/25 | 88 | 269,000 | 72 | 15.7 | 16.3 | 15.4 | 15 |
| | | 65/35 | 75 | 262,000 | 66 | 14.6 | 12.6 | 11.4 | 16 |
| | | 50/50 | 47 | 168,000 | 68 | 8.8 | 9.2 | 7.8 | 17 |
| | 68 | 85/15 | 103 | 320,000 | 72 | 16.4 | 9.0 | 1.6 | 18 |
| | | 80/20 | 98 | 307,000 | 72 | 17.3 | 17.4 | 6.5 | 19 |
| | | 75/25 | 94 | 273,000 | 71 | 16.9 | 17.6 | 14.1 | 20 |
| | | 65/35 | 85 | 255,000 | 71 | 16.2 | 15.9 | 15.4 | 21 |
| | | 50/50 | 62 | 202,000 | 69 | 12.9 | 11.2 | 11.3 | 22 |
| | | 100/0 | 114 | 370,000 | 73 | 0.5 | | | 23 |

EXAMPLE II.—STYRENE-ACRYLONITRILE-ISOBUTYLENE MIXTURE GRAFT

A. Preparation of graft copolymer

| | Parts |
|---|---|
| Diene rubber latex (Latex L, M or N of Example I, per Table IV) | 300 (provides 100 parts of rubber |
| Styrene | Varied (per Table IV) |
| Acrylonitrile | Varied (per Table IV) |
| Isobutylene | Varied (per Table IV) |
| Potassium persulfate | 0.4 |
| Dodecyl mercaptan | 0.4 |
| Water | 200 |

A series of graft copolymers was made up in accordance with the above recipe, using in each case the substrate latex, styrene, acrylonitrile and isobutylene as indicated in Table IV. In each case the selected ingredients were charged into a polymerization vessel, the free space of which was then purged with nitrogen. Polymerization was carried out with agitation at 50° C. for 4 hours, at the end of which time substantially all of the styrene, acrylonitrile and isobutylene had become polymerized. Any small traces of unpolymerized isobutylene were then vented, and the resultant latex cooled to 25° C. and stabilized by the addition of 4 parts of a heptylated diphenyl amine ("Agerite Stalite," a product of the R. T. Vanderbilt Company) and 4 parts of dimethyl ammonium dimethyl dithiocarbamate.

The resultant latex was coagulated by slowly pouring 3 volumes of the latex into 5 volumes of a 1% aqueous calcium chloride solution with vigorous stirring. The coagulated graft copolymer was dewatered by filtration, washed on the filter with water, and dried in an oven at 60° C.

B. Compounding with vinyl chloride resin

| | Parts |
|---|---|
| Vinyl chloride resin ("Exon 402-A," a polyvinyl chloride manufactured by The Firestone Tire & Rubber Co.) | [1] 80–95 |
| Graft copolymer (prepared as above described) | [1] 5–20 |
| Cadmium lauryl mercaptide | 2 |

[1] Per Table IV.

A series of compositions was made up in accordance with the foregoing schedule, using the resin and graft copolymer in various proportions as set forth in Table IV hereinbelow. In each case the ingredients, in the selected proportions, were blended and formed into laminated sheets as described in Example I above. Set forth in Table IV are the properties of the specimens prepared.

B. Preparation of graft copolymer

| | Parts |
|---|---|
| Butadiene-styrene latex (Latex P, prepared as just described) | [1] 300 |
| Styrene | 78 |
| Acrylonitrile | 22 |
| Potassium persulfate | 0.4 |
| Dodecyl mercaptan | 0.4 |
| Water | 200 |

[1] Provides 100 parts of rubber.

The above ingredients were subjected to polymerization, and the graft copolymers recovered and dried as described in Example I—"B. Preparation of Graft Copolymer."

C. Compounding with vinyl chloride resin

| | Parts |
|---|---|
| Vinyl chloride resin ("Exon 402-A," a polyvinyl chloride, manufactured by The Firestone Tire and Rubber Co.) | [1] 90 or 80 |
| Graft copolymer (prepared as just described) | [1] 10 or 20 |
| Cadmium lauryl mercaptide | 2 |

[1] Per Table V.

Two compositions were made up in accordance with the foregoing schedule, and fabricated into six-ply laminates as described above in Example I—"C. Compounding with

TABLE IV

| Substrate Latex | | Grafted Monomers (parts used in recipe) | | | Weight Ratio of Resin to Graft Copolymer | Properties | | | | | | | Item No. |
|---|---|---|---|---|---|---|---|---|---|---|---|---|---|
| Designation | Percent Butadiene in rubber | Styrene | Acrylonitrile | Isobutylene | | Hardness (Rockwell R-scale) | Modulus (Pounds per sq. inch) | Heat Distortion Temp., °C. | Notched Izod Impact Strength (Ft.-Lbs./In. Notch) at— | | | | |
| | | | | | | | | | 25° C. | 10° C. | 0° C. | −20° C. | |
| L | 100 | 78 | 22 | 0 | 90/10 | 105 | 376,000 | 72 | 17.6 | | 1.2 | 0.8 | 1 |
| | | | | | 85/15 | 98 | 307,000 | 72 | 6.7 | | 16.7 | 4.6 | 2 |
| | | | | | 80/20 | 93 | 290,000 | 71 | 16.5 | | 16.7 | 14.3 | 3 |
| | | 68 | 32 | 0 | 85/15 | 103 | 320,000 | 72 | 16.4 | | 9.0 | 1.6 | 4 |
| | | | | | 80/20 | 98 | 307,000 | 72 | 17.3 | | 17.4 | 6.5 | 5 |
| | | | | | 95/5 | 109 | 366,000 | 74 | 0.9 | | | | 6 |
| N | 80 | 11 | 39 | 10 | 90/10 | 106 | 322,000 | 74 | 16.4 | 0.9 | 0.8 | | 7 |
| | | | | | 85/15 | 97 | 275,000 | 70 | 21.0 | 12.4 | 2.7 | | 8 |
| | | | | | 80/20 | 84 | 262,000 | 65 | 20 | 9.8 | 3.4 | | 9 |
| L | 100 | 0 | 65 | 35 | 90/10 | 102 | 289,000 | 75 | 6.4 | | | | 10 |
| M | 90 | 0 | 20 | 80 | 90/10 | 107 | 372,000 | | 0.6 | | | | 11 |
| | | | | | 20/80 | 97 | 258,000 | 71 | 0.7 | | 0.4 | | 12 |
| | | 0 | 65 | 35 | 90/10 | 114 | 317,000 | 74 | 2.4 | | | | 13 |

EXAMPLE III.—BUTADIENE-STYRENE SUBSTRATE

A. Preparation of substrate

| | Parts |
|---|---|
| Butadiene | 90 |
| Styrene | 10 |
| Potassium persulfate | 0.4 |
| Dodecyl mercaptan | 0.05 |
| Water | 200 |

The above ingredients were charged into a polymerization vessel, the free space of which was then purged with butadiene vapor. The vessel was then sealed, and the polymerization carried out with agitation at 50° C. for 1–6 hours, at the end of which time the monomeric constituents were substantially completely polymerized. The as-yet-unpolymerized monomers were then vented, and the resultant latex, containing approximately 33% of a copolymer of 90% butadiene, 10% styrene, was cooled to 25° C. This latex will hereinafter be designated as Latex P.

Vinyl Chloride Resin." Tabulated herewith are the properties of the products.

TABLE V

| Weight Ratio of Resin to Graft Copolymer | Properties | | | | | |
|---|---|---|---|---|---|---|
| | Hardness (Rockwell R-scale) | Modulus (Pounds per square inch) | Heat Distortion Temp., °C. | Notched Izod Impact Strength (Ft.-Lbs./In. Notch) at— | | |
| | | | | 25° C. | 0° C. | −20° C. |
| 90/10 | 108 | 380,000 | 75 | 17.2 | 1.1 | 0.6 |
| 80/20 | 103 | 299,000 | 76 | 15.2 | 13.9 | 1.3 |

EXAMPLE IV.—ALPHA-METHYL STYRENE-ACRYLONITRILE GRAFT

The procedure of Example III was exactly repeated, except that the 78 parts of styrene were replaced by 60 parts of alpha-methyl styrene and the 22 parts of acrylonitrile were replaced by 40 parts of acrylonitrile in the recipe under "B. Preparation of Graft Copolymer." Following are the results obtained.

TABLE VI

| Weight Ratio of Resin to Graft Copolymer | Properties | | | | | |
|---|---|---|---|---|---|---|
| | Hardness (Rockwell R-scale) | Modulus (Pounds per square inch) | Heat Distortion Temp., °C. | Notched Izod Impact Strength (Ft.-Lbs./In. Notch) at— | | |
| | | | | 25° C. | 0° C. | −20° C. |
| 90/10 | 110 | 387,000 | | 5.0 | 0.7 | |
| 80/20 | 106 | 327,000 | 76 | 14.4 | 2.2 | 1.3 |

From the foregoing general description and detailed specific examples, it will be evident that this invention provides novel resinous compositions having all of the desirable properties of unplasticized polyvinyl chloride compositions, coupled with excellent toughness and impact strength at both normal and low temperatures. Polyvinyl chloride compositions heretofore prepared are well known to be seriously deficient in these last particulars. The compositions of this invention are therefore far superior to simple polyvinyl chloride compositions in those applications in which polyvinyl chloride has been successful, and moreover are applicable in fields in which the polyvinyl chloride cannot be used, i. e., in situations subject to shock and impact loads.

What is claimed is:

1. A composition comprising

|   |   |
|---|---|
|   | Percent |
| (A) A vinyl chloride resin | [1] 50–95 | blended with

| (B) A graft copolymer of a styrene-acrylonitrile-type mixture upon a diene rubber | [1] 5–50 |

[1] Based on the total weight of (A) plus (B) in the composition.

said vinyl chloride resin (A) being selected from the group consisting of homopolymers of vinyl chloride and copolymers thereof with other unsaturated compounds copolymerizable therewith and said copolymers containing at least 80% of vinyl chloride copolymerized therein, and said graft copolymer (B) being a graft copolymer produced by graft polymerizing a charge of

|   | Percent |
|---|---|
| (C) A styrene-acrylonitrile-type mixture of monomers | [1] 10–80 |
| upon | |
| (D) A diene rubber | [1] 90–20 |

[1] Based on the weight of (C) plus (D).

said styrene-acrylonitrile-type mixture (C) being selected from the group of compositions consisting of those within the system styrene, alpha-methyl styrene, acrylonitrile, methacrylonitrile, isobutylene, the proportions of these compounds lying within a quadrilateral PQRS on a trilinear chart whose corners represent respectively (E) the sum of the percentages of styrene and alpha-methyl styrene, (F) the sum of the percentages of acrylonitrile and methacrylonitrile and (G) isobutylene, the vertices of said quadrilateral having the following coordinates on said chart

| Vertex of Quadrilateral | Coordinates | | |
|---|---|---|---|
| | E | F | G |
| | Sum of Styrene plus Alpha-methyl Styrene | Sum of Acrylonitrile plus Alpha-methyl acrylonitrile | Isobutylene |
| P | 0 | 85 | 15 |
| Q | 50 | 50 | 0 |
| R | 90 | 10 | 0 |
| S | 0 | 65 | 35 | and said diene rubber (D) having polymerized therein

|   | Percent |
|---|---|
| (H) A compound selected from the group consisting of butadiene, isoprene and mixtures thereof | [1] 60–100 |
| (I) Acrylonitrile, alpha-methyl acrylonitrile, styrene, alpha-methyl styrene and mixtures thereof | [1] Up to 40 |
| (J) Other non-cross-linking monomers copolymerizable with butadiene and isoprene | [1] Up to 10 |
| (K) Other cross-linking monomers copolymerizable with butadiene and isoprene | [1] Up to 3 |

[1] Based on the weight of (H) plus (I) plus (J) plus (K).

2. A composition comprising

|   | Percent |
|---|---|
| (A) Polyvinyl chloride | [1] 50–95 | blended with

| (B) A graft copolymer of a styrene acrylonitrile-type mixture upon a diene rubber | [1] 5–50 |

[1] Based on the total weight of (A) plus (B) in the composition.

said graft copolymer (B) being a graft copolymer produced by graft polymerizing a charge of

|   | Percent |
|---|---|
| (C) A styrene-acrylonitrile-type mixture of monomers | [1] 10–80 |
| upon | |
| (D) A diene rubber | [1] 90–20 |

[1] Based on the weight of (C) plus (D).

said styrene-acrylonitrile-type mixture (C) being selected from the group of compositions consisting of those within the system styrene, alpha-methyl styrene, acrylonitrile, methacrylonitrile, isobutylene, the proportions of these compounds lying within a quadrilateral PQRS on a trilinear chart whose corners represent respectively (E) the sum of the percentages of styrene and alpha-methyl styrene, (F) the sum of the percentages of acrylonitrile and methacrylonitrile and (G) isobutylene, the vertices of said quadrilateral having the following coordinates on said chart

| Vertex of Quadrilateral | Coordinates | | |
|---|---|---|---|
| | E | F | G |
| | Sum of Styrene plus Alpha-methyl Styrene | Sum of Acrylonitrile plus Alpha-methyl acrylonitrile | Isobutylene |
| P | 0 | 85 | 15 |
| Q | 50 | 50 | 0 |
| R | 90 | 10 | 0 |
| S | 0 | 65 | 35 | and said diene rubber (D) having polymerized therein

|   | Percent |
|---|---|
| (H) A compound selected from the group consisting of butadiene, isoprene and mixtures thereof | [1] 60–100 |
| (I) Acrylonitrile, alpha-methyl acrylonitrile, styrene, alpha-methyl styrene and mixtures thereof | [1] Up to 40 |
| (J) Other non-cross-linking monomers copolymerizable with butadiene and isoprene | [1] Up to 10 |
| (K) Other cross-linking monomers copolymerizable with butadiene and isoprene | [1] Up to 3 |

[1] Based on the weight of (H) plus (I) plus (J) plus (K).

3. A composition comprising

|   | Percent |
|---|---|
| (A) A vinyl chloride resin | [1] 50–95 | blended with

| (B) A graft copolymer of a styrene-acrylonitrile-type mixture upon a diene rubber | [1] 5–50 |

[1] Based on the total weight of (A) plus (B) in the composition.

said vinyl chloride resin (A) being selected from the group consisting of homopolymers of vinyl chloride and copolymers thereof with other unsaturated compounds copolymerizable therewith and said copolymers containing at least 80% of vinyl chloride copolymerized therein, and said graft copolymer (B) being a graft copolymer produced by graft polymerizing a charge of

| | Percent |
|---|---|
| (C) A styrene-acrylonitrile-type mixture of monomers | [1] 40–80 |
| upon | |
| (D) A diene rubber | [1] 90–20 |

[1] Based on the weight of (C) plus (D).

said styrene-acrylonitrile-type mixture (C) being selected from the group of compositions consisting of those within the system styrene, alpha-methyl styrene, acrylonitrile, methacrylonitrile, isobutylene, the proportions of these compounds lying within a quadrilateral PQRS on a trilinear chart whose corners represent respectively (E) the sum of the percentages of styrene and alpha-methyl styrene, (F) the sum of the percentages of acrylonitrile and methacrylonitrile and (G) isobutylene, the vertices of said quadrilateral having the following coordinates on said chart

| | Coordinates | | |
|---|---|---|---|
| Vertex of Quadrilateral | E<br>Sum of Styrene plus Alpha-methyl Styrene | F<br>Sum of Acrylonitrile plus Alpha methyl acrylonitrile | G<br>Isobutylene |
| P | 0 | 85 | 15 |
| Q | 50 | 50 | 0 |
| R | 90 | 10 | 0 |
| S | 0 | 65 | 35 | and said diene rubber (D) having polymerized therein

| | Percent |
|---|---|
| (H) A compound selected from the group consisting of butadiene, isoprene and mixtures thereof | [1] 60–100 |
| (I) Acrylonitrile, alpha-methyl acrylonitrile, styrene, alpha-methyl styrene and mixtures thereof | [1] up to 40 |
| (J) Other non-cross-linking monomers copolymerizable with butadiene and isoprene | [1] up to 10 |
| (K) Other cross-linking monomers copolymerizable with butadiene and isoprene | [1] up to 3 |

[1] Based on the weight of (H) plus (I) plus (J) plus (K).

said composition containing not over 10%, based on the weight of vinyl chloride resin therein, of compounding ingredients soluble in the vinyl chloride resin.

4. A composition comprising

| | Percent |
|---|---|
| (A) Polyvinyl chloride | [1] 50–95 |
| blended with | |
| (B) A graft copolymer of a styrene-acrylonitrile-type mixture upon a diene rubber | [1] 5–50 | said graft copolymer (B) being a graft copolymer produced by graft polymerizing a charge of

| | Percent |
|---|---|
| (C) A styrene-acrylonitrile-type mixture of monomers | [2] 10–80 |
| upon | |
| (D) A diene rubber | [2] 90–20 |

[1] Based on the total weight of (A) plus (B) in the composition.
[2] Based on the weight of (C) plus (D).

said styrene-acrylonitrile-type mixture (C) being selected from the group of compositions consisting of those within the system styrene, alpha-methyl styrene, acrylonitrile, methacrylonitrile, isobutylene, the proportions of these compounds lying within a quadrilateral PQRS on a trilinear chart whose corners represent respectively (E) the sum of the percentages of styrene and alpha-methyl styrene, (F) the sum of the percentages of acrylonitrile and methacrylonitrile and (G) isobutylene, the vertices of said quadrilateral having the following coordinates on said chart

| | Coordinates | | |
|---|---|---|---|
| Vertex of Quadrilateral | E<br>Sum of Styrene plus Alpha-methyl Styrene | F<br>Sum of Acrylonitrile plus Alpha methyl acrylonitrile | G<br>Isobutylene |
| P | 0 | 85 | 15 |
| Q | 50 | 50 | 0 |
| R | 90 | 10 | 0 |
| S | 0 | 65 | 35 | and said diene rubber (D) having polymerized therein

| | Percent |
|---|---|
| (H) A compound selected from the group consisting of butadiene, isoprene and mixtures thereof | [1] 60–100 |
| (I) Acrylonitrile, alpha-methyl acrylonitrile, styrene, alpha-methyl styrene and mixtures thereof | [1] up to 40 |
| (J) Other non-cross-linking monomers copolymerizable with butadiene and isoprene | [1] up to 10 |
| (K) Other cross-linking monomers copolymerizable with butadiene and isoprene | [1] up to 3 |

[1] Based on the weight of (H) plus (I) plus (J) plus (K).

said composition containing not over 10%, based on the weight of polyvinyl chloride, of compounding ingredients soluble in the polyvinyl chloride.

5. A composition comprising

| | Percent |
|---|---|
| (A) Polyvinyl chloride | [1] 90 |
| blended with | |
| (B) A graft copolymer of a styrene-acrylonitrile-type mixture upon a diene rubber | [1] 10 | said graph copolymer (B) being a graft copolymer produced by graft polymerizing a charge of

| | Percent |
|---|---|
| (C) A styrene-acrylonitrile-type mixture of monomers | [2] 10–80 |
| upon | |
| (D) A diene rubber | ([2]) |

[1] Based on the total weight of (A) plus (B) in the composition.
[2] Based on the weight of (C) plus (D).

said styrene-acrylonitrile-type mixture (C) being selected from the group of compositions consisting of those within the system styrene, alpha-methyl styrene, acrylonitrile, methacrylonitrile, isobutylene, the proportions of these compounds lying within a quadrilateral PQRS on a trilinear chart whose corners represent respectively (E) the sum of the percentages of styrene and alpha-methyl styrene, (F) the sum of the percentages of acrylonitrile and methacrylonitrile and (G) isobutylene, the vertices of said quadrilateral having the following coordinates on said chart

| | Coordinates | | |
|---|---|---|---|
| Vertex of Quadrilateral | E<br>Sum of Styrene plus Alpha-methyl Styrene | F<br>Sum of Acrylonitrile plus Alpha methyl acrylonitrile | G<br>Isobutylene |
| P | 0 | 85 | 15 |
| Q | 50 | 50 | 0 |
| R | 90 | 10 | 0 |
| S | 0 | 65 | 35 | and said diene rubber (D) having polymerized therein (H) A compound selected from the group consisting of butadiene, isoprene and mixtures thereof _____ [1] 60-100
(I) Acrylonitrile, alpha-methyl acrylonitrile, styrene, alpha-methyl styrene and mixtures thereof _____ [1] Up to 40
(J) Other non-cross-linking monomers copolymerizable with butadiene and isoprene _ [1] Up to 10
(K) Other cross-linking monomers copolymerizable with butadiene and isoprene ___ [1] Up to 3

[1] Based on the weight of (H) plus (I) plus (J) plus (K).

said composition containing not over 10%, based on the weight of polyvinyl chloride, of compounding ingredients soluble in the polyvinyl chloride.

6. A composition comprising (A) A vinyl chloride resin _____ [1] 50-95
   Percent
   blended with
(B) A graft copolymer of a styrene-acrylonitrile-type mixture upon a diene rubber _____ [1] 5-50

[1] Based on the total weight of (A) plus (B) in the composition.

said vinyl chloride resin (A) being selected from the group consisting of homopolymers of vinyl chloride and copolymers thereof with other unsaturated compounds copolymerizable therewith and said copolymers containing at least 80% of vinyl chloride copolymerized therein, and said graft copolymer (B) being a graft copolymer produced by graft polymerizing a charge of (C) A styrene-acrylonitrile-type mixture of monomers _____ [1] 10-80
   Percent
   upon
(D) Polybutadiene _____ [1] 90-20

[1] Based on the weight of (C) plus (D).

said styrene-acrylonitrile-type mixture (C) being selected from the group of compositions consisting of those within the system styrene, alpha-methyl styrene, acrylonitrile, methacrylonitrile, isobutylene, the proportions of these compounds lying within a quadrilateral PQRS on a trilinear chart whose corners represent respectively (E) the sum of the percentages of styrene and alpha-methyl styrene, (F) the sum of the percentages of acrylonitrile and methacrylonitrile and (G) isobutylene, the vertices of said quadrilateral having the following coordinates on said chart

| Vertex of Quadrilateral | Coordinates | | |
|---|---|---|---|
| | E<br>Sum of Styrene plus Alpha-methyl Styrene | F<br>Sum of Acrylonitrile plus Alpha-methyl acrylonitrile | G<br>Isobutylene |
| P | 0 | 85 | 15 |
| Q | 50 | 50 | 0 |
| R | 90 | 10 | 0 |
| S | 0 | 65 | 35 |

7. A composition comprising (A) Polyvinyl chloride _____ [1] 50-95
   Percent
   blended with
(B) A graft copolymer of a styrene-acrylonitrile-type mixture upon polybutadiene _____ [1] 5-50 said graft copolymer (B) being a graft copolymer produced by graft polymerizing a charge of (C) A styrene-acrylonitrile-type mixture of monomers _____ [2] 10-80
   Percent
   upon
(D) Polybutadiene _____ [2] 90-20

[1] Based on the total weight of (A) plus (B) in the composition.
[2] Based on the weight of (C) plus (D).

said styrene-acrylonitrile-type mixture (C) being selected from the group of compositions consisting of those within the system styrene, alpha-methyl styrene, acrylonitrile, methacrylonitrile, isobutylene, the proportions of these compounds lying within a quadrilateral PQRS on a trilinear chart whose corners represent respectively (E) the sum of the percentages of styrene and alpha-methyl styrene, (F) the sum of the percentages of acrylonitrile and alpha-methyl acrylonitrile, and (G) isobutylene, the vertices of said quadrilateral having the following coordinates on said chart.

| Vertex of Quadrilateral | Coordinates | | |
|---|---|---|---|
| | E<br>Sum of Styrene plus Alpha-methyl Styrene | F<br>Sum of Acrylonitrile plus Alpha-methyl acrylonitrile | G<br>Isobutylene |
| P | 0 | 85 | 15 |
| Q | 50 | 50 | 0 |
| R | 90 | 10 | 0 |
| S | 0 | 65 | 35 |

8. A composition comprising (A) Polyvinyl chloride _____ [1] 90
   Percent
   blended with
(B) A graft copolymer of a styrene-acrylonitrile-type mixture upon polybutadiene _____ [1] 10 said graft copolymer (B) being a graft copolymer produced by graft polymerizing a charge of (C) A styrene-acrylonitrile-type mixture of monomers _____ [2] 10-80
   Percent
   upon
(D) Polybutadiene _____ ([2])

[1] Based on the total weight of (A) plus (B) in the composition.
[2] Based on the weight of (C) plus (D).

said styrene-acrylonitrile-type mixture (C) being selected from the group of compositions consisting of those within the system styrene, alpha-methyl styrene, acrylonitrile, methacrylonitrile, isobutylene, the proportions of these compounds lying within a quadrilateral PQRS on a trilinear chart whose corners represent respectively (E) the sum of the percentages of styrene and alpha-methyl styrene, (F) the sum of the percentages of acrylonitrile and methacrylonitrile and (G) isobutylene, the vertices of said quadrilateral having the following coordinates on said chart

| Vertex of Quadrilateral | Coordinates | | |
|---|---|---|---|
| | E<br>Sum of Styrene plus Alpha-methyl Styrene | F<br>Sum of Acrylonitrile plus Alpha-methyl acrylonitrile | G<br>Isobutylene |
| P | 0 | 85 | 15 |
| Q | 50 | 50 | 0 |
| R | 90 | 10 | 0 |
| S | 0 | 65 | 35 |

9. A composition comprising (A) A vinyl chloride resin _____ [1] 50-95
   Percent
   blended with
(B) A graft copolymer of a styrene-acrylonitrile-type mixture upon a rubbery copolymer of butadiene and acrylonitrile _____ [1] 5-50

[1] Based on the total weight of (A) plus (B) in the composition.

said vinyl chloride resin (A) being selected from the group consisting of homopolymers of vinyl chloride and copolymers thereof with other unsaturated compounds copolymerizable therewith and said copolymers containing at least 80% of vinyl chloride copolymerized therein, and said graft copolymer (B) being a graft copolymer produced by graft polymerizing a charge of (C) A styrene-acrylonitrile-type mixture of monomers .................................... [1] 10–80 upon (D) A rubbery copolymer of 90% butadiene, 10% acrylonitrile, based on the weight of the rubbery copolymer .................................... [1] 90–20

[1] Based on the weight of (C) plus (D).

said styrene-acrylonitrile-type mixture (C) being selected from the group of compositions consisting of those within the system styrene, alpha-methyl styrene, acrylonitrile, methacrylonitrile, isobutylene, the proportions of these compounds lying within a quadrilateral PQRS on a trilinear chart whose corners represent respectively (E) the sum of the percentages of styrene and alpha-methyl styrene, (F) the sum of the percentages of acrylonitrile and methacrylonitrile and (G) isobutylene, the vertices of said quadrilateral having the following coordinates on said chart

| Vertex of Quadrilateral | Coordinates | | |
|---|---|---|---|
| | E Sum of Styrene plus Alpha-methyl Styrene | F Sum of Acrylonitrile plus Alpha-methyl acrylonitrile | G Isobutylene |
| P | 0 | 85 | 15 |
| Q | 50 | 50 | 0 |
| R | 90 | 10 | 0 |
| S | 0 | 65 | 35 |

10. A composition comprising (A) Polyvinyl chloride .................................... [1] 50–95 blended with (B) A graft copolymer of a styrene-acrylonitrile-type mixture upon a rubbery copolymer of butadiene and acrylonitrile .................................... [1] 5–50 said graft copolymer (B) being a graft copolymer produced by graft polymerizing a charge of (C) A styrene-acrylonitrile-type mixture of monomers .................................... [2] 10–80 upon (D) A rubbery copolymer of 90% butadiene, 10% acrylonitrile, based on the weight of the rubbery copolymer .................................... [2] 90–20

[1] Based on the total weight of (A) plus (B) in the composition.
[2] Based on the weight of (C) plus (D).

said styrene-acrylonitrile-type mixture (C) being selected from the group of compositions consisting of those within the system styrene, alpha-methyl styrene, acrylonitrile, methacrylonitrile, isobutylene, the proportions of these compounds lying within a quadrilateral PQRS on a trilinear chart whose corners represent respectively (E) the sum of the percentages of styrene and alpha-methyl styrene, (F) the sum of the percentages of acrylonitrile and methacrylonitrile and (G) isobutylene, the vertices of said quadrilateral having the following coordinates on said chart

| Vertex of Quadrilateral | Coordinates | | |
|---|---|---|---|
| | E Sum of Styrene plus Alpha-methyl Styrene | F Sum of Acrylonitrile plus Alpha-methyl acrylonitrile | G Isobutylene |
| P | 0 | 85 | 15 |
| Q | 50 | 50 | 0 |
| R | 90 | 10 | 0 |
| S | 0 | 65 | 35 |

11. A composition comprising (A) Polyvinyl chloride .................................... [1] 90 blended with (B) A graft copolymer of a styrene-acrylonitrile-type mixture upon a rubbery copolymer of butadiene and acrylonitrile .................................... [1] 10 said graft copolymer (B) being a graft copolymer produced by graft polymerizing a charge of (C) A styrene-acrylonitrile-type mixture of monomers .................................... [2] 10–80 upon (D) A rubbery copolymer of 90% butadiene, 10% acrylonitrile, based on the weight of the rubbery copolymer .................................... [2] 90–20

[1] Based on the total weight of (A) plus (B) in the composition.
[2] Based on the weight of (C) plus (D).

said styrene-acrylonitrile-type mixture (C) being selected from the group of compositions consisting of those within the system styrene, alpha-methyl styrene, acrylonitrile, methacrylonitrile, isobutylene, the proportions of these compounds lying within a quadrilateral PQRS on a trilinear chart whose corners represent respectively (E) the sum of the percentages of styrene and alpha-methyl styrene, (F) the sum of the percentages of acrylonitrile and methacrylonitrile and (G) isobutylene, the vertices of said quadrilateral having the following coordinates on said chart

| Vertex of Quadrilateral | Coordinates | | |
|---|---|---|---|
| | E Sum of Styrene plus Alpha-methyl Styrene | F Sum of Acrylonitrile plus Alpha-methyl acrylonitrile | G Isobutylene |
| P | 0 | 85 | 15 |
| Q | 50 | 50 | 0 |
| R | 90 | 10 | 0 |
| S | 0 | 65 | 35 |

12. A composition comprising (A) A vinyl chloride resin .................................... [1] 50–95 blended with (B) A graft copolymer of a styrene-acrylonitrile-type mixture upon a rubbery copolymer of butadiene and acrylonitrile .................................... [1] 5–50

[1] Based on the total weight of (A) plus (B) in the composition.

said vinyl chloride resin (A) being selected from the group consisting of homopolymers of vinyl chloride and copolymers thereof with other unsaturated compounds copolymerizable therewith and said copolymers containing at least 80% of vinyl chloride copolymerized therein, and said graft copolymer (B) being a graft polymer produced by graft polymerizing a charge of (C) A styrene-acrylonitrile-type mixture of monomers _____ [1] 10–80
upon
(D) A rubbery copolymer of 75% butadiene, 25% acrylonitrile, based on the weight of said rubbery copolymer _____ [1] 90–20

[1] Based on the weight of (C) plus (D).

said styrene-acrylonitrile-type mixture (C) being selected from the group of compositions consisting of those within the system styrene, alpha-methyl styrene, acrylonitrile, methacrylonitrile, isobutylene, the proportions of these compounds lying within a quadrilateral PQRS on a trilinear chart whose corners represent respectively (E) the sum of the percentages of styrene and alpha-methyl styrene, (F) the sum of the percentages of acrylonitrile and methacrylonitrile, and (G) isobutylene, the vertices of said quadrilateral having the following coordinates on said chart

| Vertex of Quadrilateral | Coordinates | | |
|---|---|---|---|
| | E<br>Sum of Styrene plus Alpha-methyl Styrene | F<br>Sum of Acrylonitrile plus Alpha-methyl acrylonitrile | G<br>Isobutylene |
| P | 0 | 85 | 15 |
| Q | 50 | 50 | 0 |
| R | 90 | 10 | 0 |
| S | 0 | 65 | 35 |

13. A composition comprising

Percent
(A) Polyvinyl chloride _____ [1] 50–95
blended with
(B) A graft copolymer of a styrene-acrylonitrile-type mixture upon a rubbery copolymer of butadiene and acrylonitrile _____ [1] 5–50 said graft copolymer (B) being a graft copolymer produced by graft polymerizing a charge of Percent
(C) A styrene-acrylonitrile-type mixture of monomers _____ [2] 10–80
upon
(D) A rubbery copolymer of 75% butadiene, 25% acrylonitrile, based on the weight of said rubbery copolymer _____ [2] 90–20

[1] Based on the total weight of (A) plus (B) in the composition.
[2] Based on the weight of (C) plus (D).

said styrene-acrylonitrile-type mixture (C) being selected from the group of compositions consisting of those within the system styrene, alpha-methyl styrene, acrylonitrile, methacrylonitrile, isobutylene, the proportions of these compounds lying within a quadrilateral PQRS on a trilinear chart whose corners represent respectively (E) the sum of the percentages of styrene and alpha-methyl styrene, (F) the sum of the percentages of acrylonitrile and methacrylonitrile and (G) isobutylene, the vertices of said quadrilateral having the following coordinates on said chart

| Vertex of Quadrilateral | Coordinates | | |
|---|---|---|---|
| | E<br>Sum of Styrene plus Alpha-methyl Styrene | F<br>Sum of Acrylonitrile plus Alpha-methyl acrylonitrile | G<br>Isobutylene |
| P | 0 | 85 | 15 |
| Q | 50 | 50 | 0 |
| R | 90 | 10 | 0 |
| S | 0 | 65 | 35 |

14. A composition comprising

Percent
(A) Polyvinyl chloride _____ [1] 90
blended with
(B) A graft copolymer of a styrene-acrylonitrile-type mixture upon a rubbery copolymer of butadiene and acrylonitrile _____ [1] 10 said graft copolymer (B) being a graft copolymer produced by graft polymerizing a charge of (C) A styrene-acrylonitrile-type mixture of monomers _____ [2] 10–80
upon
(D) A rubbery copolymer of 75% butadiene, 25% acrylonitrile, based on the weight of said rubbery copolymer _____ [2] 90–20

[1] Based on the total weight of (A) plus (B) in the composition.
[2] Based on the weight of (C) plus (D).

said styrene-acrylonitrile-type mixture (C) being selected from the group of compositions consisting of those within the system styrene, alpha-methyl styrene, acrylonitrile, methacrylonitrile, isobutylene, the proportions of these compounds lying within a quadrilateral PQRS on a trilinear chart whose corners represent respectively (E) the sum of the percentages of styrene and alpha-methyl styrene, (F) the sum of the percentages of acrylonitrile and methacrylonitrile and (G) isobutylene, the vertices of said quadrilateral having the following coordinates on said chart

| Vertex of Quadrilateral | Coordinates | | |
|---|---|---|---|
| | E<br>Sum of Styrene plus Alpha-methyl Styrene | F<br>Sum of Acrylonitrile plus Alpha-methyl acrylonitrile | G<br>Isobutylene |
| P | 0 | 85 | 15 |
| Q | 50 | 50 | 0 |
| R | 90 | 10 | 0 |
| S | 0 | 65 | 35 |

15. A composition comprising

Percent
(A) Polyvinyl chloride _____ [1] 90
blended with
(B) A graft copolymer of a styrene-acrylonitrile mixture upon polybutadiene _____ [1] 10 said graft copolymer (B) being a graft copolymer of (C) A styrene-acrylonitrile mixture _____ [2] 50
upon
(D) Polybutadiene _____ [2] 50 and said styrene-acrylonitrile mixture (C) comprising (E) Styrene _____ [3] 78
and
(F) Acrylonitrile _____ [3] 22

[1] Based on the total weight of (A) plus (B) in the composition.
[2] Based on the weight of (C) plus (D).
[3] Based on the weight of (E) plus (F).

16. A composition comprising

Percent
(A) Polyvinyl chloride _____ [1] 90
blended with
(B) A graft copolymer of a styrene-acrylonitrile-isobutylene mixture upon a rubbery copolymer of butadiene and acrylonitrile _____ [1] 10

[1] Based on the total weight of (A) plus (B) in the composition.

said graft copolymer (B) being a graft copolymer of (C) A styrene-acrylonitrile-isobutylene mixture ___ ² 40
   upon
(D) A rubbery butadiene-acrylonitrile copolymer __ ² 60 said styrene-acrylonitrile-isobutylene mixture (C) comprising (E) Styrene _____ ³ 18
(F) Acrylonitrile _____ ³ 65
(G) Isobutylene _____ ³ 17 and said butadiene-acrylonitrile copolymer (D) comprising a copolymer of (H) Butadiene _____ ⁴ 80
   and
(I) Acrylonitrile _____ ⁴ 20

² Based on the weight of (C) plus (D).
³ Based on the weight of (E) plus (F) plus (G).
⁴ Based on the weight of (H) plus (I).

17. A composition comprising

|   | Percent |
|---|---|
| (A) Polyvinyl chloride | ¹ 80 | blended with (B) A graft copolymer of an alpha-methyl styrene-acrylonitrile mixture upon a rubbery butadiene-styrene copolymer _____ ¹ 20 said graft copolymer (B) being a graft copolymer of (C) A mixture of alpha-methyl styrene and acrylonitrile _____ ² 50
   upon
(D) A rubbery butadiene-styrene copolymer _____ ² 50 said mixture (C) of alpha-methyl styrene and acrylonitrile comprising (E) Alpha-methyl styrene _____ ³ 60
   and
(F) Acrylonitrile _____ ³ 40 and said butadiene-styrene copolymer (D) comprising a copolymer of (H) Butadiene _____ ⁴ 90
   and
(I) Styrene _____ ⁴ 10

¹ Based on the total weight of (A) plus (B) in the composition.
² Based on the weight of (C) plus (D).
³ Based on the weight of (E) plus (F).
⁴ Based on the weight of (H) plus (I).

18. A composition comprising

|   | Percent |
|---|---|
| (A) Polyvinyl chloride | ¹ 90 | blended with (B) A graft copolymer of a styrene-acrylonitrile mixture upon a rubbery copolymer of butadiene and acrylonitrile _____ ¹ 10 said graft copolymer (B) being a graft copolymer of (C) A styrene-acrylonitrile mixture _____ ² 50
   upon
(D) A rubbery copolymer of butadiene and acrylonitrile _____ ² 50 said styrene-acrylonitrile mixture (C) comprising (E) Styrene _____ ³ 78
   and
(F) Acrylonitrile _____ ³ 22 and said rubbery copolymer (D) being a copolymer of (H) Butadiene _____ ⁴ 90
   and
(I) Acrylonitrile _____ ⁴ 10

¹ Based on the total weight of (A) plus (B) in the composition.
² Based on the weight of (C) plus (D).
³ Based on the weight of (E) plus (F).
⁴ Based on the weight of (H) plus (I).

19. A composition comprising

|   | Percent |
|---|---|
| (A) Polyvinyl chloride | ¹ 90 | blended with (B) A graft copolymer of a styrene-acrylonitrile mixture upon a rubbery copolymer of butadiene and styrene _____ ¹ 10 said graft copolymer (B) being a graft copolymer of (C) A styrene-acrylonitrile mixture _____ ² 50
   upon
(D) A rubbery copolymer of butadiene and styrene ² 50 said styrene-acrylonitrile mixture (C) comprising (E) Styrene _____ ³ 78
   and
(F) Acrylonitrile _____ ³ 22 and said rubbery copolymer (D) being a copolymer of (H) Butadiene _____ ⁴ 90
   and
(I) Styrene _____ ⁴ 10

¹ Based on the total weight of (A) plus (B) in the composition.
² Based on the weight of (C) plus (D).
³ Based on the weight of (E) plus (F).
⁴ Based on the weight of (H) plus (I).

20. A polyvinyl chloride sheet material having the composition of claim 1.

21. A molded article having the composition of claim 1.

References Cited in the file of this patent

UNITED STATES PATENTS 2,636,866    Banes et al. _____ Apr. 28, 1953

UNITED STATES PATENT OFFICE
CERTIFICATE OF CORRECTION

Patent No. 2,802,809                                          August 13, 1957

Robert A. Hayes

It is hereby certified that error appears in the printed specification of the above numbered patent requiring correction and that the said Letters Patent should read as corrected below.

Column 3, lines 68 and 69, for "nicelle-forming," read -- micelle-forming-- column 6, line 55, for "on" read -- one --; column 13, line 10, for "40-80" read -- 10-80 --; column 16, line 38, after "Polybutadiene - - - ($2$)" insert -- 90-20 --; column 18, line 74, for "polymer" read -- copolymer --.

Signed and sealed this 3rd day of June 1958.

(SEAL)
Attest:

KARL H. AXLINE
Attesting Officer

ROBERT C. WATSON
Commissioner of Patents